Feb. 7, 1961 E. V. BUNTING ET AL 2,970,659
IMPLEMENT LIFT ARRANGEMENT FOR TRACTORS
Filed Oct. 17, 1956 3 Sheets-Sheet 3
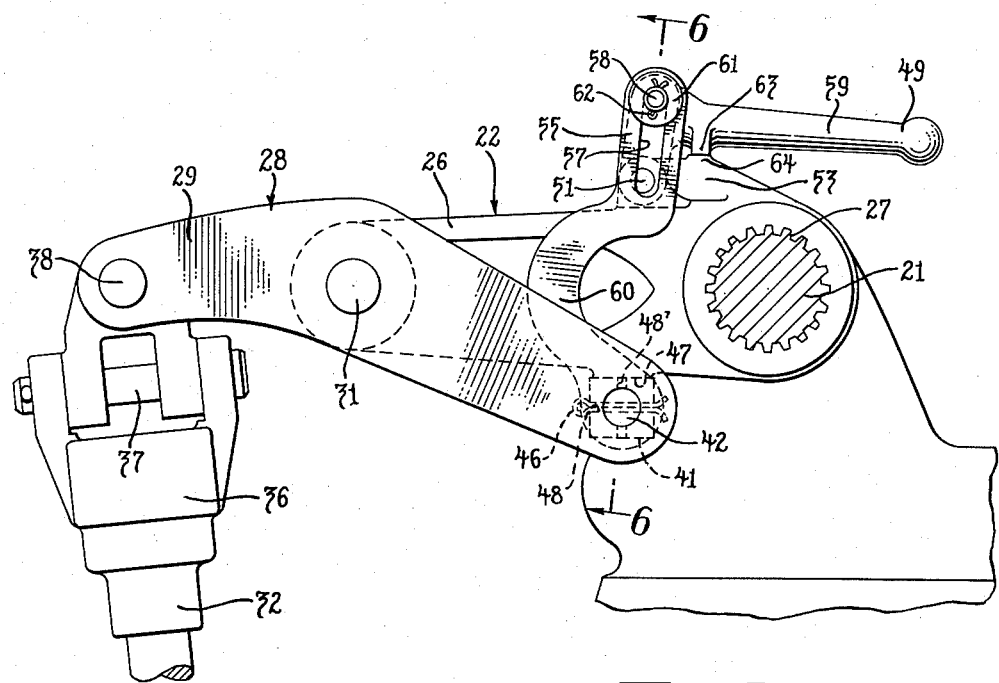
Fig. 5
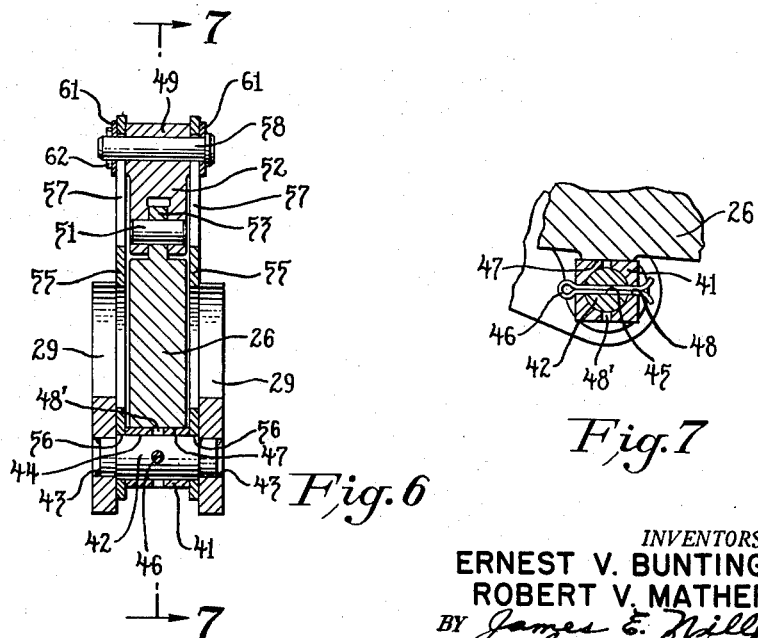
Fig. 6
Fig. 7
INVENTORS.
ERNEST V. BUNTING &
ROBERT V. MATHERS
BY
ATTORNEYS.

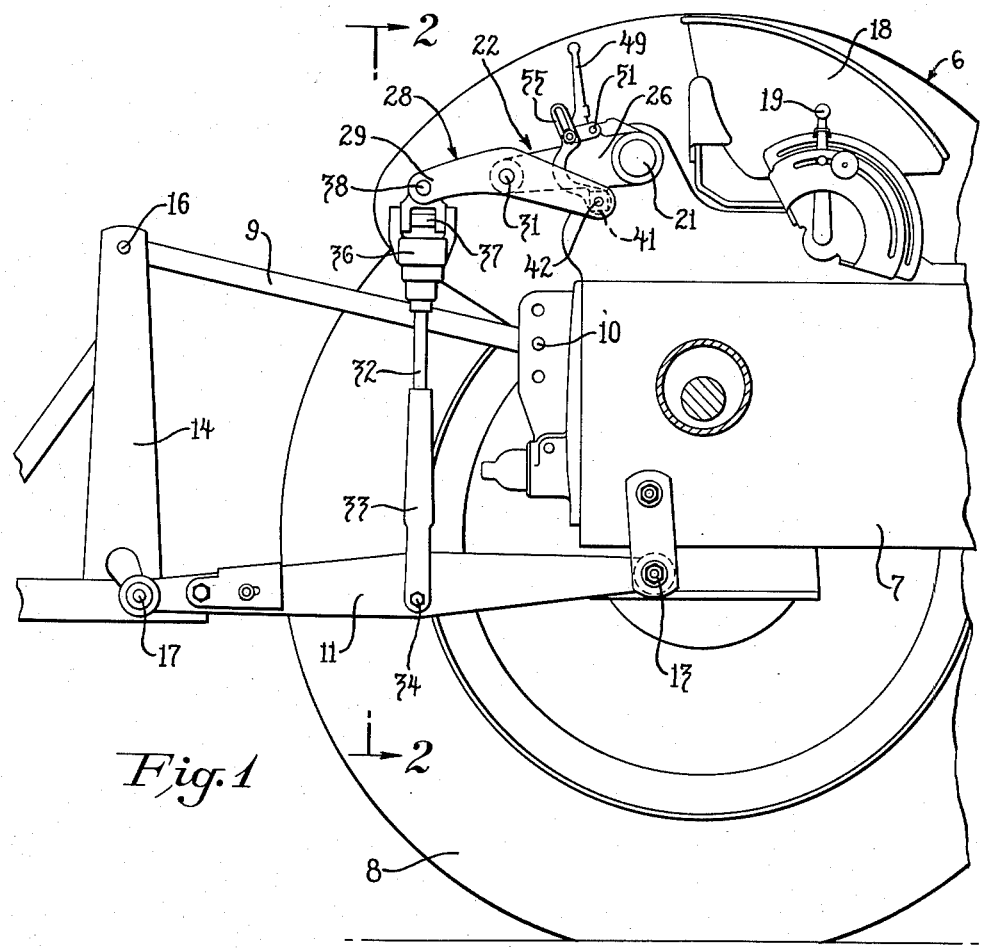
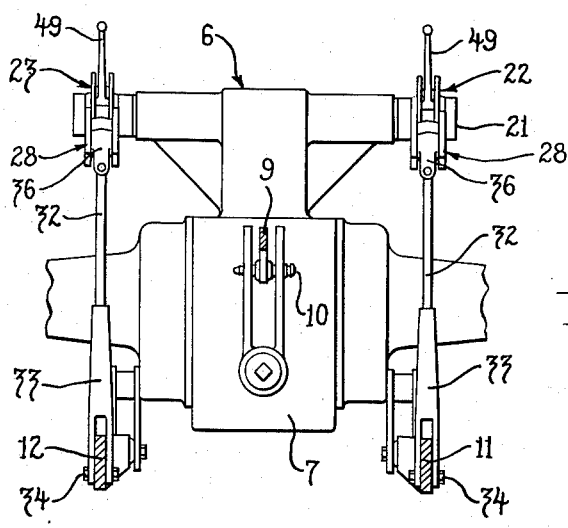
Fig. 1
Fig. 2
INVENTORS.
ERNEST V. BUNTING &
ROBERT V. MATHERS
ATTORNEYS.

United States Patent Office 2,970,659
Patented Feb. 7, 1961

2,970,659

IMPLEMENT LIFT ARRANGEMENT FOR TRACTORS

Ernest V. Bunting, Detroit, and Robert V. Mathers, Livonia, Mich., assignors to Massey-Ferguson Inc., a corporation of Maryland Filed Oct. 17, 1956, Ser. No. 616,433

8 Claims. (Cl. 172—501)

This invention relates to tractors and implements and more specifically to a lift structure for controlling implements mounted on a tractor.

A wide variety of implements are mountable on agricultral tractors so that they may be operated in a ground working position and so that they may be lifted and lowered between their ground working and transport positions. Some of these implements are substantially wider than the tractor and are provided with gauge wheels which support the implements in their ground working positions and guide them so that they may move vertically a limited amount and tilt laterally to follow the contour of the soil independently of the position of the tractor. Still other implements are relatively narrow and are completely supported from the tractor so that the wheels of the tractor act as gauge wheels. These implements require a hitch which will hold the implement against tilting movement from side to side relative to the tractor. Since the same tractor is used for both types of implements, it is desirable that both types of implement connection be readily available.

Furthermore, because of the great number of different implements now used it is necessary that any of the implements may be readily connected and disconnected from the tractor.

With this in mind, it is a general object of the invention to provide an improved implement lift structure which is selectively adjustable to afford either a flexible connection in which the implement may move vertically and tilt laterally independently of the tractor or a more stable connection in which the implement is held against tilting movement relative to the tractor.

Another object of the invention is to provide an implement lift structure by which the tractor hitch points may be moved relative to each other to facilitate alignment with laterally spaced hitch points on the implement, thereby making for ready attachment and detachment of a wide variety of implements.

More specifically, it is an object of the invention to provide an implement lift structure incorporating power actuated arms and lift arms having a one-way lift connection therebetween so that the implement may be free to move relative to the actuating arms and yet be lifted to a transport position on the tractor. Moreover a mechanism is provided by which the one-way lift connection may be made continuously operable so that the actuating arms and lift arms move as a unit and the implement may be held in a generally stable condition in which the implement is held against lateral tilting movement relative to the tractor.

The foregoing and other objects and advantages are attained by the present invention, various novel features of which will be apparent from the following description and from the accompanying drawings disclosing a preferred embodiment of the invention.

In the drawings:

Fig. 1 is a side elevation of a rear portion of a tractor incorporating the invention, one of the rear wheels of the tractor being removed for purposes of disclosure.

Fig. 2 is a fragmentary sectional view taken generally on line 2—2, Fig. 1.

Fig. 5 is a view similar to Fig. 3 showing a different condition of operation of the lift structure.

Fig. 6 is a sectional view taken on line 6—6 in Fig. 5; and

Fig. 7 is a fragmentary section taken approximately along the lower half of line 7—7 in Fig. 6.

Figure 3:
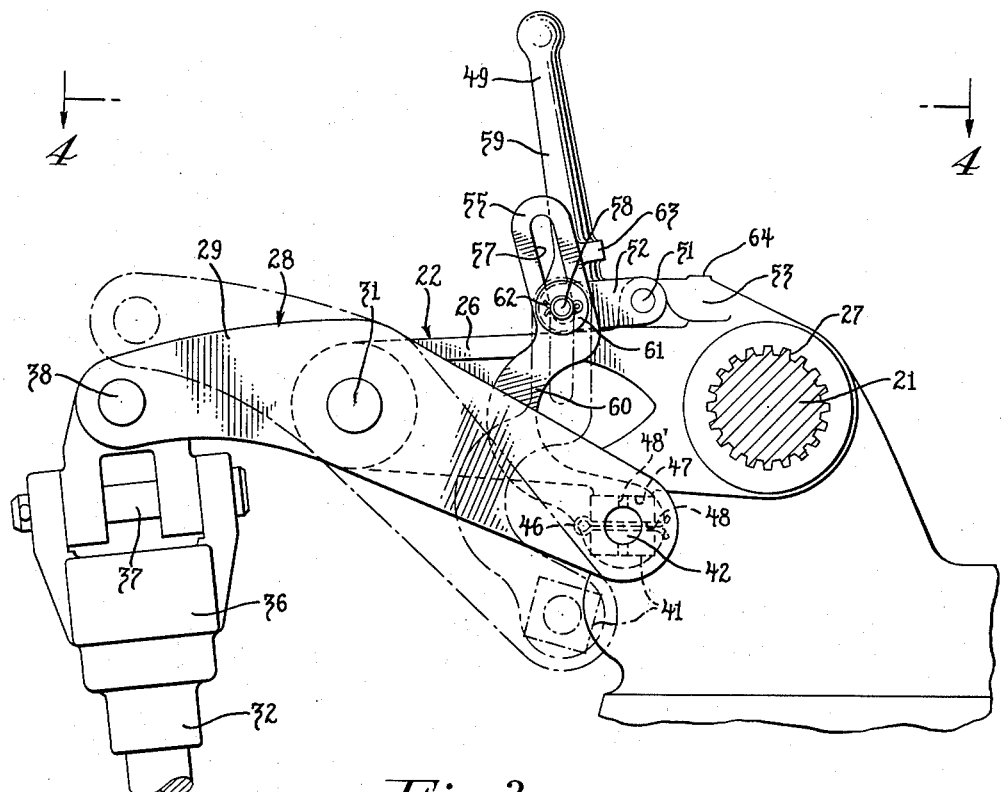
Fig. 3 is an enlarged side view of the lift structure shown in Fig. 1 with parts broken away.

Referring to the drawings a preferred embodiment of the invention is shown in association with the rear portion of a conventional agricultural tractor 6 having the body portion 7 supported between a pair of rear traction wheels 8. The rear portion of the tractor is provided with a hitch structure including an upper link 9 pivotally connected by a pin 10 to a mid-portion of the tractor and a pair of lower draft links 11 and 12 pivotally connected by couplers 13 to opposite sides of the tractor body portion 7.

The rearward ends of the draft links 11 and 12 and the upper link 9 form what is now well-known as a three-point hitch by which a great variety of implements may be connected to the tractor for movement between a ground working position and a transport position. As seen in Fig. 1, the implement 14, which is illustrative of any one of the many types of implements that may be used, is connected to the upper link 9 by a pivot pin 16 and to the rearward portions of draft links 11 and 12 by laterally spaced pins 17 (only one is shown) on the implement 14.

The implement 14 and the linkages 9, 11, 12 may be raised and lowered by a lift structure which is actuated by a power lift system (not shown). Such power lift systems are widely used with agricultural tractors and for the purpose of this disclosure it is merely necessary to consider that an operator in the tractor seat 18 may manipulate a manual control lever 19 to actuate the system and bring about movement of the lift structure and consequently the hitch linkage and the implement.

The lift structure associated with the hitch linkages includes a transversely extending lift shaft 21 rotatably supported on an upper rear portion of the tractor body 7 and a pair of lift assemblies 22 and 23 disposed at opposite ends of the lift shaft 21, respectively. Since the lift assemblies are identical, specific reference will now be made to the assembly 22 associated with the right side of the tractor.

Figure 4:
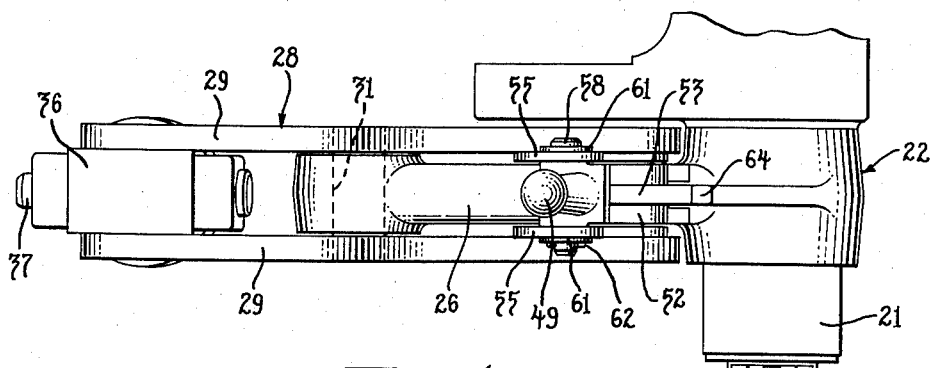
Fig. 4 is a plan view of the structure shown in Fig. 3.

Referring to the drawings and particularly to Figs. 3 and 4, the lift assembly 22 includes an actuating arm 26 rigidly connected as by splines 27 to a portion adjacent the end of the lift shaft 21 so that the actuating arm extends rearwardly of the lift shaft 21 for up and down swinging movement upon movement of the shaft. A double lift arm 28 is pivotally connected to the free end of the actuating arm 26 and is made up of a pair of identical crank arms 29 disposed at opposite sides of the lift arm with corresponding intermediate portions pivotally connected by a pin 31 to the rearward end of the actuating arm.

The rearward end of the lift arm assembly 28 is connected to the draft link 11 through a lift link 32 having its lower end provided with a clevis 33 pivotally connected to the draft link 11 by means of a pin 34. The upper end of the lift link is provided with a coupler 36 which affords universal movement about a pivot pin 37 and a pin 38. The pin 38 extends through laterally aligned openings in the rear end portions of the crank arms 29 and affords a pivot for the coupler 36 so that upon vertical movement of the draft links 11, the lift arm assembly 28 will also move.

Normally, the weight of the implement 17 will urge the draft link 11 downwardly and, consequently, lift arm 28 will tend to rotate in a counterclockwise direction relative to actuating arm 26 as viewed in Fig. 3. Such movement is limited by an element in the form of a block 41 mounted between forward portions of the crank arms 29 and secured in position by means of a pin 42 (Fig. 6) passing through aligned openings 43 in both of the crank arms 29 and an opening 44 formed eccentrically in the block 41, so that its axis is at a slightly different distance from each of the four block surfaces. The pin is fixed in the openings 43 by some means such as welding and the block is secured against rotation relative to the pin by a key 46. As seen in Fig. 7, the key 46 passes through a transverse opening 45 in pin 42 and either opening 48 or 48' in the block 41. In this manner the block 41 may be disposed in one of four different positions and affords a means for adjusting the distance of pin 42 from the actuating arm when block 41 engages the latter.

The block 41 affords a one-way lift connection between the actuating arm 26 and the lift arm 28 so that upon rotation of the lift shaft to swing the actuating arm upwardly or in a clockwise direction as seen in Figs. 1 and 3, the weight of the implement 17 will cause counterclockwise rotation of the lift arm 28 until block 41 moves into engagement with a pad 47 formed on the bottom side of the actuating arm 26. Continued upward swinging movement of the actuating arm 26 will also cause upward swinging movement of the lift arm 28 so that the draft link 11 will be pivoted upwardly through means of the lift link 32.

The lift structure also includes a selectively operable lock means by which the block 41 may be maintained in continuous engagement with the actuating arm for movement of the actuating arm 26 and the lift arm 28 as a unit or by which the lift arm may be released for limited movement relative to the actuating arm.

The lock means includes a lock element or lever 49 pivotally connected by a pin 51 to the actuating arm 26. The lock lever is generally L-shaped and its short leg 52 is bifurcated as shown in Fig. 6 and is disposed at opposite sides of a web 53 formed integrally on the top side of the actuating arm 26. The pin 51 passes through aligned apertures in the bifurcations and in the web to afford a pivot for the lever 49. The lever 49 is also connected to the lift arm 28 through a pair of identical links 55, each having a curved portion 60. The curved portion affords resiliency to the link and makes it possible for the link to elongate slightly for a purpose to be described later. The links 55 are disposed at opposite sides of the actuating arm 26 and as seen in Fig. 6, the lower ends of the links are each provided with an opening 56 to receive the pin 42 which also acts to position the block 41. The upper ends of the links 55 are provided with identical slots 57 which receive the opposite ends of a connecting pin 58 mounted at the junction of the short leg 52 and a long leg 59 forming the handle portion of lever 49. The links 55 are retained on the pin 58 by washers 61 and a key 62 so that the links are free to move relative to the lever 49 within the limits afforded by the slot 57. The L-shaped lever 49 may be pivoted clockwise about the pin 51 from a first position shown in Fig. 3 to a second position shown in Fig. 5. In the second position a stop portion 63 formed integrally with the handle engages a complementary stop portion 64 formed at the top portion of the web 53.

In the full line position shown in Fig. 3, counterclockwise movement of lift arms 28 relative to actuating arm 26 is prevented by engagement of block 41 with pad 47 and, in the broken line position, clockwise movement of the lift arm 28 is prevented by engagement of pin 58 with the upper end of the slots 57. These two positions illustrate the limits of swinging of arm 28 relative to the actuating arm 26. It will be noted that such swinging movement will not affect the lever 49 and that it will remain in the position shown due to the lost motion connection between lever 49 and the lift arm 28 afforded by the slot and pin connection 57, 58.

When the lock lever 49 is moved from the position shown in Fig. 3, toward the position shown in Fig. 5, the pin 58 will slide in the slot 57 until it engages the upper end of the slot. Further movement of the lever 49 will move the links 55 together with the lift arm 28 and the drop link 32 until the block 41 engages the pad 47 formed integrally with the underside of the actuating arm 26. At this point, further movement of lift arm 28 relative to actuating arm 26 will stop. However, the lever 49 will not have reached its locked position, that is, stop 63 will be spaced slightly from the complementary stop 64 and the pin 58 will be slightly to the left of a line passing through the pins 42 and 51. Continued movement of the lever 49 in a clockwise direction will cause a distortion of the curved portions 60 of links 55 so that the effective lengths of the links are increased until pin 58 reaches its dead center position, that is, until the first, second and third points afforded by pins 51, 42 and 58, respectively, are in a straight line. The amount of link distortion required to achieve the dead center position may be adjusted to some desired value by selecting a desired one of the four available positions of block 41 on pin 42. As the pin 58 passes over center or to a position at the right of a line passing through pins 42 and 51, stop 63 will engage stop 64. The links 55 will tend to return to their original shape and act as a resilient means to clamp stop 63 against stop 64 and block 41 against pad 47. The lever 49 will, therefore, be retained in this locked position so that the lost motion connection afforded by pin 58 and slot 57 is inoperative to permit relative movement of the lift arm and actuating arm and so that the one-way lift connection afforded by block 41 and pad 47 is continuously maintained for movement of the arms 26 and 28 as a unit. It will be noted that in the unlocked position shown in Fig. 3, the coupling pin 58 is adjacent the actuating arm 26 and is offset to one side of a line passing through pins 42 and 51, and that in the locked position shown in Fig. 5 the pin 58 is remote from the actuating arm 26.

As previously pointed out, the lift assembly 23 associated with the other end of the lift shaft 21 and the draft link 12 is identical to the lift assembly 22 just described. It will, therefore, be appreciated that with both of the levers 49 shown in Fig. 2 in an unlocked position the lift arms 28 are free to swing relative to each other, but that with the levers 49 in their locked position the lift arms 28 are held in a fixed relation to their associated actuating arms and the lift shaft 21 and also in laterally aligned relation to each other so that they move in unison upon movement of the lift shaft 21. Therefore, in the unlocked condition of the lift assemblies 22 and 23, the draft links 11 and 12 may swing vertically in opposite directions to each other. This permits the implement 17 connected to a rear portion of the draft links 11 and 12 to move vertically a limited amount relative to the actuating arms and also to tilt a limited amount relative to the tractor. Furthermore, relative movement of the draft links facilitates hitching of an implement to the tractor by making it possible to more easily align the rear ends of the draft links 11 and 12 with the laterally spaced connecting pins 17 on the implement. On the other hand, when the lift assemblies 22 and 23 are in their locked position, the draft links are retained in laterally aligned relation to each other for simultaneous movement upon movement of the lift assemblies 22 and 23. An implement connected to the draft links 11 and 12 is consequently retained in a vertically balanced or stable position on the tractor and is not permitted any tilting movement or vertical movement independently of the actuating arms 26.

During operation of the rear mounted implement in its lower or ground working position and with both of the levers 49 disposed as shown in Fig. 3, the lift links 32 will be free to move vertically relative to actuating arms 26 and to each other within the limits defined by the engagement of block 41 with pad 47 and the engagement of pin 58 with the upper end of the slot 57. This affords a flexible lift connection between the implement 14 forming the structure to be lifted and the tractor by which the implement may tilt laterally and move vertically a limited amount relative to the tractor even though the actuating arms 26 and the lift shaft 21 are held in some fixed position. Since this limited range of implement movement is determined by the position of the lift shaft 21 and the actuating arms 26, an entirely different range of limited movement may be afforded for the lift arms 28 by rotating the lift shaft 21 slightly to some new position.

As seen in Fig. 1, the lock levers 49 are within convenient reach from the operator's seat 18 so that the lift assemblies may be readily changed from a condition in which the implement is held vertically stable relative to the actuating arms 26 to a condition in which the implement may float vertically and tilt a limited amount independently of the actuating arms.

When the implement is raised to a transport position with levers 49 in their unlocked position, the lift shaft 21 is rotated so that the actuating arms 26 swing in a clockwise direction as viewed in Fig. 3, and the pins 31 will move upwardly. The implement will remain in its ground working position due to its weight and, consequently, pins 38 will remain relatively stationary so that upward movement of the lift arm pins 31 will cause counterclockwise movement of the lift arms 28 until such time as the blocks 41 engage their corresponding pads 47 on the respective actuating arms 26. Subsequent upward movement of the actuating arms will then be effective to swing the lift arms 28 to lift the implement. During such lifting movement, the blocks 41 will remain in engagement with the pads 47 due to the weight of the implement 14.

If lifting movement of the implement begins when the implement is in a laterally tilted position relative to the tractor, the block 41 on the lift arm 28 associated with the low side of the implement will engage its associated pad 47 so that the lower side of the implement is raised first until the block 41 associated with the other lift arm 28 moves into engagement with its corresponding actuating arm 26. Thereafter, further rotation of the lift shaft 21 will raise both sides of the implement uniformly the remainder of the distance to the transport position.

It will now be apparent that there has been provided an implement lift structure including lift arms 28 and actuating arms 26 which are connected together through a one-way lift connection permitting both limited vertical movement and lateral tilting movement of an implement relative to the tractor and making it possible to lift the implement to a transport position on the tractor upon rotation of the power actuated lift shaft. The lift structure is provided with lock means which may be selectively actuated by the operator to retain the various parts in a position so that the one-way connection is continuously operative and the implement is held against tilting movement and vertical movement is dependent upon movement of the lift shaft. Furthermore, the lock means include a lost motion connection between each actuating arm and its lift arm which permits relative movement and which may be adjusted so that the lost motion connection is ineffective and the one-way lift connection is continuously maintained. This mechanism makes for easy alignment of complementary attaching parts on an implement and tractor and also for easily changing the lift structure so that vertical movement and tilting of the implement may be made to depend on or to be independent of tractor movement.

It should be understood that it is not intended to limit the invention to the above described forms and details, and that the invention includes such other forms and modifications as are embraced by the scope of the appended claims.

We claim as our invention:

1. In an implement lift structure for a tractor, the combination comprising, an actuating arm adapted to be mounted for up and down swinging movement on said tractor, a lift arm pivotally connected at an intermediate portion to the free end of said actuating arm for swinging movement relative to each other, a one-way lift connection between said actuating arm and one end of said lift arm, a lever pivoted on said actuating arm, a link having opposite ends connected to said lever and to said lift arm, respectively, said lever being swingable from a first position in which said lift arm is free to swing relative to said actuating arm to a second position in which said lift arm is retained in position for said one-way connection to be effective to swing said arms as a unit.

2. An implement lift structure for a tractor, comprising an actuating arm adapted to be mounted for up and down swinging movement on said tractor, a lift arm connected at an intermediate portion to the free end of said actuating arm for swinging movement relative thereto, a lock lever pivotally connected to a first point on said actuating arm, a link pivotally connected at opposite ends to a second point on said lift arm and to a third point on said lever, respectively, said lever being swingable between a locked position in which said first, second and third points are disposed in a substantially straight line for preventing relative swinging movement of said lift arm and actuating arm, and an unlocked position in which said third point is offset from a line passing through said first and second points to permit relative swinging movement of said actuating arm and lift arm.

3. An implement lift structure for a tractor, comprising a lift shaft adapted to be rotatably mounted on the tractor, power means operatively connected to said shaft for rotating the latter, an actuating arm rigidly connected to said shaft for rotation therewith, a lift arm connected at an intermediate portion to the free end of said actuating arm for swinging movement relative thereto, a one-way lift connection between said actuating arm and said lift arm, a lock element mounted on said actuating arm, a link, and means connecting opposite ends of said link to said lift arm and said lock element, respectively, said means including a lost motion connection, said lock element being movable between a first position in which said lost motion connection permits relative swinging movement of said actuating and lift arms and a second position in which said lost motion connection is taken up and said one-way connection is retained by said link in a position operative to cause swinging movement of said lift and actuating arms as a unit with said lift shaft.

4. An implement lift structure for a tractor, comprising an actuating arm, a lift arm having an intermediate portion pivotally connected to the free end of said actuating arm, a one-way lift connection between one end of said lift arm and said actuating arm, the other end of said lift arm adapted for coupling to a structure to be lifted, a link having one end pivoted to said one end of said lift arm, a lever pivoted to said actuating arm and having a coupling pin spaced from its pivot point, said link having a slot in its other end slidably receiving said coupling pin, said lever being swingable between a first position in which said coupling pin is disposed adjacent said actuating arm and said lift arm is free to swing relative to said actuating arm, and a second position in which said coupling pin is remote from said actuating arm and said link is operative to lock said lift arm for movement with said actuating arm.

5. In an implement lift structure for a tractor, the combination comprising, an actuating arm adapted to be mounted for up and down swinging movement on said tractor, a lift arm connected at an intermediate portion to the free end of said actuating arm for swinging movement relative thereto, a one-way lift connection between said actuating arm and said lift arm including an element secured to one end of said lift arm and engageable with said actuating arm, a lock lever pivotally connected to a first point on said actuating arm, a link pivotally connected at opposite ends to a second point on said lift arm and to a third point on said lever, respectively, said lever being swingable from an unlocked position in which said third point is offset from a line passing through said first and second points to permit relative swinging movement of said actuating arm and lift arm, to a locked position in which said third point is over center relative to said first and second points and said element is in engagement with said actuating arm, said link having a resilient portion intermediate opposite ends of said link to permit elongation of the latter as said lever approaches said locked position and to resiliently retain said element in engagement with said actuating arm for movement of said actuating and lift arms as a unit.

6. An implement lift structure for a tractor having a draft link adapted for coupling to an implement comprising, in combination, a power rotated actuating arm, a lift arm pivoted to the free end of said actuating arm, means coupling one end of said lift arm to said draft link, said arms having mutually engageable abutment surfaces preventing rotation of said lift arm on said actuating arm when the latter is rotated for lifting the draft link, a manually operable lever pivoted to one of said arms and being swingable into two alternate limit positions, a locking link having pivotal connections with both said lever and the arm on which the lever is not pivoted, one of said locking link connections permitting limited sliding movement of the link when said lever is in one limit position so that the lift arm may freely swing on said actuating arm, said lever being effective when in its other position to completely take up said limited sliding movement and urge said arm abutment surfaces into contact so that said arms act as one rigid arm.

7. An implement lift structure for a tractor having an actuating arm pivotally mounted at one end to swing in a vertical plane relative to the tractor, a lift arm pivotally connected intermediate its ends to the free end of said actuating arm, a multisided element supported adjacent the forward end of said lift arm in position to abut against the actuating arm, said element being rotatable about an eccentric axis to present different sides to said actuating arm and thereby vary the relative angular positions of said arms, and a linkage connected between said arms operable to draw said element into engagement with said actuating arm, said linkage including a resilient link operative to accommodate its length to any selected spacing of the arms.

8. An implement lift structure for a tractor having an actuating arm pivotally mounted at its forward end to swing relative to the tractor in a vertical plane, a lift arm pivotally connected intermediate its ends to the rear end of said actuating arm, an element supported adjacent the forward end of said lift arm and having a plurality of abutment surfaces for selectively abutting said actuating arm to form a one-way lift connection between the arms and determine the relative positions of the arms when lifting, said element being adjustable for selectively bringing different ones of said abutment surfaces into engagement with said actuating arm, said abutment surfaces being spaced on said element to vary said relative positions of the arms when different ones of said surfaces engage said actuating arm, and a linkage coupling said lift arm and said actuating arm for selectively drawing and locking said element into engagement with the actuating arm, said linkage including a resilient link operative to accommodate its length to any of said relative positions of the arms as determined by the adjustment of said element.

References Cited in the file of this patent
UNITED STATES PATENTS

| | | |
|---|---|---|
| 545,987 | Van Brunt | Sept. 10, 1895 |
| 2,140,144 | Silver | Dec. 13, 1938 |
| 2,775,180 | Du Shane | Dec. 25, 1956 |